(12) United States Patent
Liu et al.

(10) Patent No.: US 11,899,633 B2
(45) Date of Patent: Feb. 13, 2024

(54) MANAGING STORAGE DEVICE SCRUBBING

(71) Applicant: EMC IP Holding Company LLC, Hopkinton, MA (US)

(72) Inventors: Bing Liu, Tianjin (CN); Rahul Deo Vishwakarma, Bangalore (IN)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 16/928,155

(22) Filed: Jul. 14, 2020

(65) Prior Publication Data

US 2022/0019564 A1   Jan. 20, 2022

(51) Int. Cl.
*G06F 16/215* (2019.01)
*G06F 9/48* (2006.01)

(52) U.S. Cl.
CPC .......... *G06F 16/215* (2019.01); *G06F 9/4881* (2013.01)

(58) Field of Classification Search
None
See application file for complete search history.

(56) References Cited

U.S. PATENT DOCUMENTS 7,278,067 B1 * 10/2007 Coatney ............. G11B 20/1816
                                                  714/54
8,327,250 B1 * 12/2012 Goel ................... G06F 11/1092
                                                  714/801
8,407,191 B1      3/2013 Nanda
11,018,991 B1    5/2021 Vishwakarma et al.
2008/0065815 A1 * 3/2008 Nasu ..................... G06F 3/0665
                                                  711/103

OTHER PUBLICATIONS

Feng Chen; Hystor: Making the Best Use of Solid State Drives in High Performance Storage Systems; 2011; ACM; pp. 22-24 (Year: 2011).*

(Continued)

*Primary Examiner* — Albert M Phillips, III
*Assistant Examiner* — Jermaine A Mincey
(74) *Attorney, Agent, or Firm* — Muirhead and Saturnelli, LLC (57) ABSTRACT

From among physical storage devices (PSDs) of a storage system, a set of two or more of the PSDs that are eligible for scrubbing may be determined; and from among the set, a relative eligibility of the PSDs may be determined. Conformance prediction analysis may be applied to determine the set and the relative eligibility of PSDs of the set. The conformance prediction analysis may determine a scrubbing eligibility classification (e.g., label), and a confidence value for the classification, which may serve as the relative eligibility of the PSD. The eligible PSDs may be ranked in an order according to determined confidence values, and may be further classified according to such order. The future workload of the storage system may be forecasted, and the scrubbing of PSDs may be scheduled based on the forecasted workload of the system and the relative eligibilities of the set of PSDs.

17 Claims, 6 Drawing Sheets

(56) References Cited

OTHER PUBLICATIONS

T. J. E. Schwarz, Qin Xin, E. L. Miller, D. D. E. Long, A. Hospodor and S. Ng, "Disk scrubbing in large archival storage systems," *The IEEE Computer Society's 12th Annual International Symposium on Modeling, Analysis, and Simulation of Computer and Telecommunications Systems, 2004. (MASCOTS 2004). Proceedings.*, 2004, pp. 409-418, doi: 10.1109/MASCOT.2004.1348296.

Jehan-François Pâris, et al., "Improving Disk Array Reliability Through Expedited Scrubbing," 2010 Fifth IEEE International Conference on Networking, Architecture, and Storage, *The IEEE Computer Society's*, 2010.

\* cited by examiner

| Rank | PSD ID | Health Score |
|---|---|---|
| 1 | Z29Z3KN_00009330KBD2 | 0.934426 |
| 2 | Z29Z3A6_00009330EHZU | 0.819672 |
| 3 | Z29Z5TP_00009329ZNXU | 0.770492 |
| 4 | Z29Z45F_00009330IWGZ | 0.763187 |
| 5 | Z29Z5MQ_00009330K4FR | 0.754098 |
| 6 | Z29Z421_00009330KB5X | 0.606557 |
| 7 | Z29Z4LB_00009330K3D5 | 0.491803 |
| 8 | Z29Z5R8_00009330EX5L | 0.47541 |
| 9 | Z29Z43S_00009330IX16 | 0.459016 |
| 10 | Z29Z3MV_00009330K6PW | 0.360656 |
| 11 | Z29Z5NR_00009330EJ5E | 0.278689 |
| 12 | Z29Z5H8_00009330EX93 | 0.163934 |
| 13 | Z29Z3EA_00009330JW2D | 0.131148 |
| 14 | Z29Z3NM_00009329JENE | 0.081967 |
| ... | ... | ... |
| 30 | Z29Z6DW_00009330JUKS | 0.043547 |

FIG. 5

| PSD Health Category | Scrub Frequency Category | Heath Score Range |
|---|---|---|
| Best | LOW (CYCLE A) | 0.9 – 0.7 |
| Medium | MEDIUM (CYCLE B) | 0.6 – 0.4 |
| Poor | HIGH (CYCLE C) | 0.3 – 0.1 |

MANAGING STORAGE DEVICE SCRUBBING

BACKGROUND

Technical Field

This application generally relates to data storage systems, and more particularly to managing the scrubbing of physical storage devices on a data storage system.

Description of Related Art

Data storage systems (often referred to herein simply as "storage systems") may include storage resources used by one or more host systems (sometimes referred to herein as "hosts"), i.e., servers, to store data. One or more storage systems and one or more host systems may be interconnected by one or more network components, for example, as part of a switching fabric, to form a data storage network (often referred to herein simply as "storage network"). Storage systems may provide a variety of data services to host systems of the storage network.

A host system may have host applications that utilize the data services provided by one or more storage systems of the storage network to store data on the physical storage devices (e.g., tape, disks or solid state devices) thereof. For a given application, to perform input/output (IO) operations utilizing a physical storage device of the storage system, one or more components of the host system, storage system and network components therebetween may be used. The one or more combinations of components of the host, switch and storage system over which IO operations between an application and storage device can be communicated may be considered an IO path between the application and the storage device. These IO paths define a connectivity of the storage network.

Host systems may not address the physical storage devices of a storage systems directly, but rather access to data may be provided to one or more host systems from what the host system(s) view as a plurality of logical storage units (LSUs) including, for example, logical blocks, logical devices (also referred to as logical volumes, LUNs and logical disks), thin devices, groups of logical devices (e.g., storage groups), NVMe namespaces, and other types of LSUs. LSUs are described in more detail elsewhere herein.

SUMMARY OF THE INVENTION

In an embodiment of the invention, a method is performed for a storage system including a plurality PSDs. The method includes determining a set of two or more of the plurality of PSDs that are eligible for scrubbing, determining a relative eligibility for each PSD of the set of PSDs relative to other PSDs of the set, scheduling scrubbing of the set of PSDs, including, for each PSD of the set, scheduling a scrubbing of the PSD based on the relative eligibility of the PSD, and scrubbing the set of PSDs according to the schedule. Scheduling the scrubbing of the set of PSDs may include, for each PSD of the set, scheduling a frequency of scrubbing of the PSD based on the relative eligibility of the PSD. The method further may include predicting amounts of workload activity on the storage system during future time periods, where the scrubbing of the set of PSDs is scheduled based on the predicted amounts of workload activity. The method further may include ranking the PSDs in an order according to the relative eligibility of the PSDs, where the scrubbing of the set of PSDs is based on the order. Determining the set may include selecting each PSD of the set based on a similarity between characteristics of the PSD and characteristics of PSDs previously determined to be eligible for scrubbing. The method further may include performing conformal prediction analysis on the plurality of PSDs, which includes determining the set. Determining the set may include, for each PSD of the plurality of PSDs, classifying the PSD as either eligible for scrubbing or not eligible for scrubbing. Performing conformal prediction analysis may include calculating, for each PSD of the set of PSDs, a confidence in the classification of the PSD as eligible for scrubbing, where the calculated confidence serves as the relative eligibility of the PSD.

In another embodiment, a storage system includes a plurality PSDs, and executable logic that implements a method. The method includes determining a set of two or more of the plurality of PSDs that are eligible for scrubbing, determining a relative eligibility for each PSD of the set of PSDs relative to other PSDs of the set, scheduling scrubbing of the set of PSDs, including, for each PSD of the set, scheduling a scrubbing of the PSD based on the relative eligibility of the PSD, and scrubbing the set of PSDs according to the schedule. Scheduling the scrubbing of the set of PSDs may include, for each PSD of the set, scheduling a frequency of scrubbing of the PSD based on the relative eligibility of the PSD. The method further may include predicting amounts of workload activity on the storage system during future time periods, where the scrubbing of the set of PSDs is scheduled based on the predicted amounts of workload activity. The method further may include ranking the PSDs in an order according to the relative eligibility of the PSDs, where the scrubbing of the set of PSDs is based on the order. Determining the set may include selecting each PSD of the set based on a similarity between characteristics of the PSD and characteristics of PSDs previously determined to be eligible for scrubbing. The method further may include performing conformal prediction analysis on the plurality of PSDs, which includes determining the set. Determining the set may include, for each PSD of the plurality of PSDs, classifying the PSD as either eligible for scrubbing or not eligible for scrubbing. Performing conformal prediction analysis may include calculating, for each PSD of the set of PSDs, a confidence in the classification of the PSD as eligible for scrubbing, wherein the calculated confidence serves as the relative eligibility of the PSD.

In another embodiment, computer-readable media having software stored thereon defining a method of managing scrubbing of PSDs is provided for a storage system including a plurality of PSDs. The software includes executable code that determines a set of two or more of the plurality of PSDs that are eligible for scrubbing, executable code that determines a relative eligibility for each PSD of the set of PSDs relative to other PSDs of the set, executable code that schedules scrubbing of the set of PSDs, including, for each PSD of the set, scheduling a scrubbing of the PSD based on the relative eligibility of the PSD, and executable code that scrubs the set of PSDs according to the schedule. The software further may include executable code that predicts amounts of workload activity on the storage system during future time periods, where the scrubbing of the set of PSDs is scheduled based on the predicted amounts of workload activity. The software further may include executable code that ranks the PSDs in an order according to the relative eligibility of the PSDs, where the scrubbing of the set of PSDs is based on the order. Determining the set may include selecting each PSD of the set based on a similarity between characteristics of the PSD and characteristics of PSDs previously determined to be eligible for scrubbing.

BRIEF DESCRIPTION OF THE DRAWINGS

Features and advantages of the present invention will become more apparent from the following detailed description of illustrative embodiments thereof taken in conjunction with the accompanying drawings in which.

DETAILED DESCRIPTION OF EMBODIMENTS

Physical storage devices (PSDs) may experience media error, for example, bit rot, physical damage or other errors associated with a PSD wearing down over time, which results in the corruption of data stored on the PSD. It is undesirable that such errors manifest themselves during IO activity—when data is being read from, or written to, disk. For this reasons, PSDs may be scrubbed, including, for example, by performing media sweeps, to determine if there are any such media errors, e.g., latent media errors, on the PSDs. Scrubbing may include, for example, comparing the data stored on the PSD with a checksum of the data, which itself may reside on the PSD. If the scrubbing detects a media error and/or corrupted data resulting from the media error, the scrubbing process may include reconstructing the corrupted data into its proper form if possible.

Given the size of some of today's storage systems (on the order of hundreds of terabytes, petabytes, or even more), scrubbing the entire population of PSDs for a storage system too frequently may significantly increase the load of the storage system, and may degrade storage system performance. Furthermore, reading data from a PSD during scrubbing may result in further wear on the PSD. Thus, the greater the frequency of scrubbing, the greater the wear on PSDs and the greater the overall load and resulting likelihood of performance degradation of the storage system. One solution to the foregoing problems would be to scrub PSDs less frequently. However, scrubbing less frequently may reduce the likelihood of detecting and addressing media errors in a timely fashion; i.e., before IO activity accessing a PSD location having media error.

In some embodiments, the foregoing problems may be addressed by reducing the number of PSDs scrubbed (e.g., per scrubbing cycle), for example, limiting examination to only those PSDs that are determined to need it most. Thus, analysis may be performed to determine which PSDs need scrubbing more than others. For example, a plurality of PSD parameter values may be analyzed to determine which PSDs will be scrubbed and which will not be scrubbed. While such determination reduces the number of PSDs scrubbed, e.g., during a given scrubbing cycle, it does not differentiate characteristics of the PSDs with respect to scrubbing, which may be desirable to enable a more granular approach to scrubbing. For example, such determination may not take into account that some PSDs may be deemed healthier than others, for which it may be desirable to scrub the PSD less than PSDs deemed to be not as healthy, e.g., in poor health.

Described herein are techniques and mechanisms for determining, from among the PSDs of a storage system, a set of two or more PSDs that are eligible for scrubbing, and, from among the set, determining a relative eligibility of the PSDs relative to other PSDs of the set. To determine the set and the relative eligibility of PSDs of the set, any of a variety of machine learning (ML), deep learning (DL) and/or statistical analysis may be performed, including conformance prediction analysis. Conformance prediction analysis may be performed on the PSDs of the storage system to classify each PSD as eligible for scrubbing or ineligible for scrubbing. For example, the conformance prediction analysis may be configured such that an ineligibility determination is indicative of a PSD that is deemed to be failing to such an extent that it is not even worth scrubbing the PSD, but rather that the PSD be taken offline for more rigorous analysis; otherwise the PSD is deemed eligible for scrubbing.

In addition to determining a scrubbing eligibility classification (e.g., label), the conformance prediction analysis (or other form of statistical analysis) may be configured to determine a confidence value for the classification, which may serve as the relative eligibility of the PSD. The details of conformance prediction analysis according to embodiments of the invention are described in more detail elsewhere herein. In some embodiments, the confidence value for a PSD may be considered a health score for the PSD, as described in more details elsewhere herein. The eligible PSDs may be ranked in an order according to determined confidence values, and may be further classified according to such order. For example, the eligible PSDs may be grouped into two or more categories (e.g., best health, medium health and poor health) based on the order.

In some embodiments, the future workload of the storage system may be forecasted, using any of a variety of forecasting or prediction algorithms. For example, it may be forecasted how busy the storage system will be—e.g., ranging from very busy to idle—during future periods of time based on historical workload information. The scrubbing of PSDs may be scheduled based on the forecasted workload of the system. For example, more (or all) scrubbing may be scheduled during idle periods of time of the system. Further, eligible PSDs may be scheduled for scrubbing based on their relative eligibilities (e.g., eligibility ranks and/or eligibility categories). For example, the higher the eligibility ranking (e.g., health score) or eligibility category (e.g., health category) of the PSDs, the less frequently it may be scheduled for scrubbing, at least in general, such that less healthy PSDs get scrubbed more frequently. For example, multiple scrubbing cycles may be established, each scrubbing cycle corresponding to a health category; e.g., high frequency, medium frequency, low frequency may be defined, corresponding to worst health, medium health and best health, respectively.

It should be appreciated that, in some cases, the set of two or more PSDs determined to be eligible for scrubbing may include all of the PSDs of the storage system. In such cases, while scrubbing is performed for all PSDs, improved system performance and reduced wear of PSDs may still be achieved by managing the frequency with which scrubbing is performed based on relative eligibilities as described herein.

Illustrative embodiments of the invention will now be described in more detail in relation to the figures.

Figure 1:
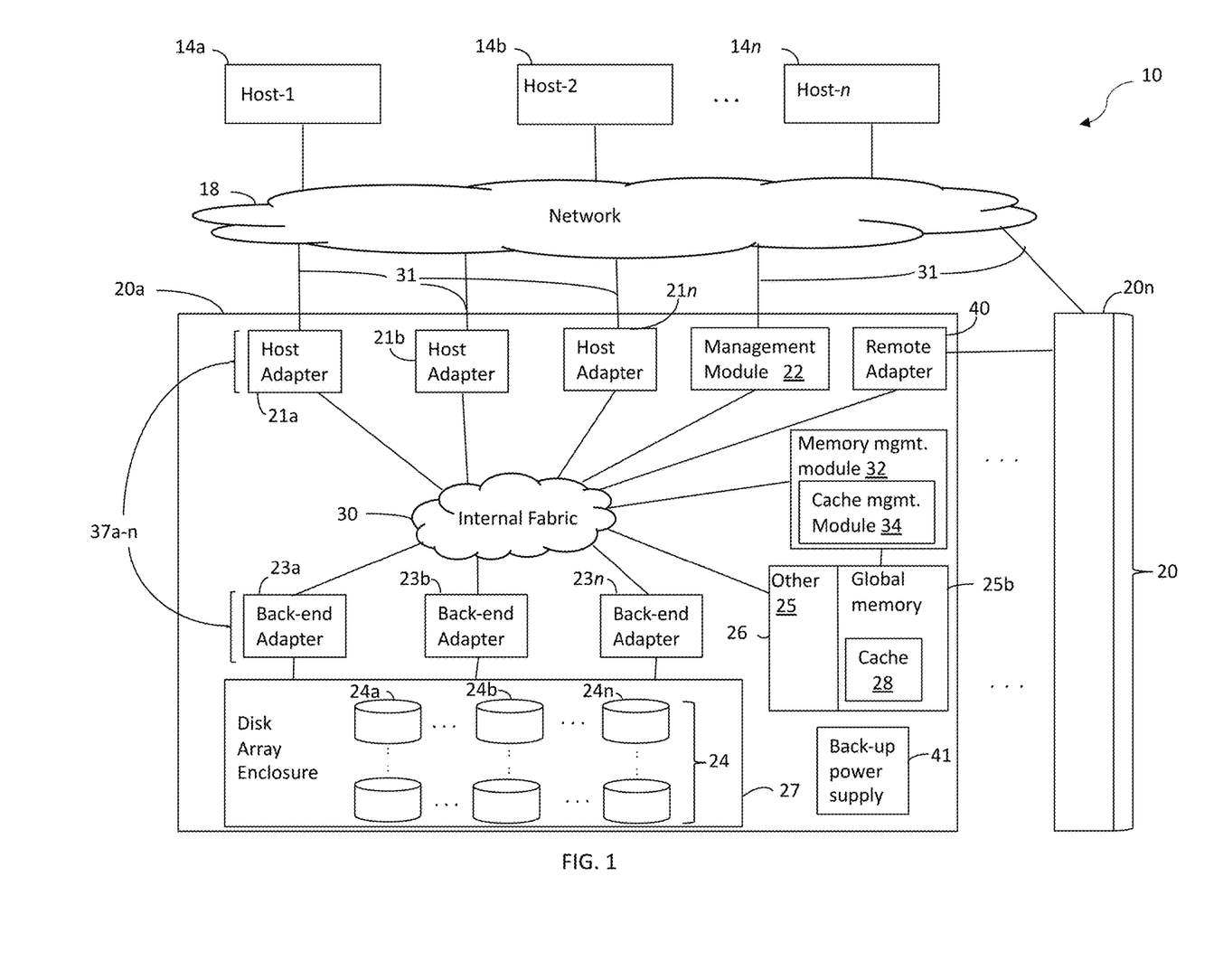
FIG. 1 is a block diagram illustrating an example of a data storage network, according to embodiments of the invention.

FIG. 1 illustrates an example of an embodiment of a data storage network 10 (often referred to herein as a "storage network"). The storage network 10 may include any of: host systems (i.e., "hosts") 14a-n; network 18; one or more storage systems 20a-n; other components; or any suitable combination of the foregoing. Storage systems 20a-n, connected to host systems 14a-n through network 18, may collectively constitute a distributed storage system 20. All of the host computers 14a-n and storage systems 20a-n may be located at the same physical site, or, alternatively, two or more host computers 14a-n and/or storage systems 20a-n may be located at different physical locations. Storage network 10 or portions thereof (e.g., one or more storage systems 20a-n in combination with network 18) may be any of a variety of types of storage networks, such as, for example, a storage area network (SAN), e.g., of a data center. Embodiments of the invention are described herein in reference to storage system 20a, but it should be appreciated that such embodiments may be implemented using other discrete storage systems (e.g., storage system 20n), alone or in combination with storage system 20a.

The N hosts 14a-n may access the storage system 20a, for example, in performing input/output (IO) operations or data requests, through network 18. For example, each of hosts 14a-n may include one or more host bus adapters (HBAs) (not shown) that each include one or more host ports for connecting to network 18. The network 18 may include any one or more of a variety of communication media, switches and other components known to those skilled in the art, including, for example: a repeater, a multiplexer or even a satellite. Each communication medium may be any of a variety of communication media including, but not limited to: a bus, an optical fiber, a wire and/or other type of data link, known in the art. The network 18 may include at least a portion of the Internet, or a proprietary intranet, and components of the network 18 or components connected thereto may be configured to communicate in accordance with any of a plurality of technologies, including, for example: SCSI, ESCON, Fibre Channel (FC), iSCSI, FCoE, GIGE (Gigabit Ethernet), NVMe over Fabric (NVMeoF); other technologies, or any suitable combinations of the foregoing, each of which may have one or more associated standard specifications. In some embodiments, the network 18 may be, or include, a storage network fabric including one or more switches and other components. A network located externally to a storage system that connects host systems to storage system resources of the storage system, may be referred to herein as an "external network."

Each of the host systems 14a-n and the storage systems 20a-n included in the storage network 10 may be connected to the network 18 by any one of a variety of connections as may be provided and supported in accordance with the type of network 18. The processors included in the host computer systems 14a-n may be any one of a variety of proprietary or commercially available single or multi-processor system, such as an Intel-based processor, or other type of commercially available processor able to support traffic in accordance with each particular embodiment and application. Each of the host computer systems may perform different types of IO operations in accordance with different tasks and applications executing on the hosts. In the embodiment of FIG. 1, any one of the host computers 14a-n may issue an IO request to the storage system 20a to perform an IO operation. For example, an application executing on one of the host computers 14a-n may perform a read or write operation resulting in one or more IO requests being transmitted to the storage system 20a.

Each of the storage systems 20a-n may be manufactured by different vendors and inter-connected (not shown). Additionally, the storage systems 20a-n also may be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of IO requests as may be issued by each of the host computer systems 14a-n, for example, to the storage systems 20a-20n. It should be appreciated that the particulars of the hardware and software included in each of the components that may be included in the storage systems 20a-n are described herein in more detail, and may vary with each particular embodiment.

Each of the storage systems, such as 20a, may include a plurality of physical storage devices (PSDs) 24 (e.g., physical non-volatile storage devices) such as, for example, disk devices, solid-state storage devices (SSDs, e.g., flash, storage class memory (SCM), NVMe SSD, NVMe SCM) or even magnetic tape, and may be enclosed within a disk array enclosure (DAE) 27. In some embodiments, two or more of the PSDs 24 may be grouped or arranged together, for example, in an arrangement consisting of N rows of PSDs 24a-n. In some embodiments, one or more PSDs (e.g., one of the rows 24a-n of PSDs) may be connected to a back-end adapter ("BE") (e.g., a director configured to serve as a BE) responsible for the backend management of operations to and from a portion of the PSDs 24. A BE is sometimes referred to by those in the art as a disk adapter ("DA") because of the development of such adapters during a period in which disks were the dominant type of PSD used in storage systems, even though such so-called DAs may be configured to manage other types of PSDs (e.g., SSDs). In the system 20a, a single BE, such as 23a, may be responsible for the management of one or more (e.g., a row) of PSDs, such as row 24a. That is, in some configurations, all IO communications with one or more PSDs 24 may be controlled by a specific BE. BEs 23a-n may employ one or more technologies in communicating with, and transferring data to/from, PSDs 24, for example, SAS, SATA or NVMe. For NVMe, to enable communication between each BE and the PSDs that it controls, the storage system may include a PCIe switch for each PSD controlled by the BE; i.e., connecting the PSD to the controlling BE.

It should be appreciated that the PSDs are not limited to being arranged in rows. Further, the DAE 27 is not limited to enclosing disks, as the name may suggest, but may be constructed and arranged to enclose a plurality of any type of PSD, including any of those described herein, or combinations thereof.

The system 20a also may include one or more host adapters ("HAs") 21a-n, which also are referred to herein as front-end adapters ("FAs") (e.g., directors configured to serve as FAs). Each of these FAs may be used to manage communications and data operations between one or more host systems and global memory (GM) 25b of memory 26. The FA may be, or include, a Fibre Channel (FC) adapter if FC is a technology being used to communicate between the storage system 20a and the one or more host systems 14a-n, or may be another type of adapter based on the one or more technologies being used for IO communications.

Also shown in the storage system 20a is a remote adapter ("RA") 40. The RA may be, or include, hardware that includes a processor used to facilitate communication between storage systems (e.g., 20a and 20n), such as between two of the same or different types of storage systems, and/or may be implemented using a director.

Storage system 20a also may include a management module 22, which may be configured (e.g., dedicated) to performing storage management functions or services such as, for example, storage provisioning, device configuration, tier management, other services, or any combination of other services. The management module may be configured to be accessed by only certain personnel (e.g., storage administrators, support engineers) and may have its own dedicated hardware, firmware, software, CPU resources and OS, and may be loaded with one or more applications, tools, CLIs, APIs and the like to enable management. In some embodiments, the management module, or portions thereof, may be located external to storage system 20a, for example, as part of one of host systems 14a-n or another separate system connected to storage system 20a via network 18.

The FAs, BEs and RA may be collectively referred to herein as directors 37a-n. Each director 37a-n may be implemented (e.g., in hardware, firmware, software or a combination thereof) on a circuit board that includes memory resources (e.g., at least a segment of GM portion 25b) and compute resources, for example, one or more processing cores (e.g., as part of a CPU) and/or a CPU complex for processing IO operations, and that as described in more detail elsewhere herein. There may be any number of directors 37a-n, which may be limited based on any of a number of factors, including spatial, computation and storage limitations. In an embodiment disclosed herein, there may be up to sixteen directors coupled to the memory 26. Other embodiments may use a higher or lower maximum number of directors.

System 20a also may include an internal switching fabric (i.e., internal fabric) 30, which may include one or more switches, that enables internal communications between components of the storage system 20a, for example, directors 37a-n (FAs 21a-n, BEs 23a-n, RA 40, management module 22) and memory 26, e.g., to perform IO operations. One or more internal logical communication paths may exist between the directors and the memory 26, for example, over the internal fabric 30. For example, any of the directors 37a-n may use the internal fabric 30 to communicate with other directors to access any of PSDs 24; i.e., without having to use memory 26. In addition, one of the directors 37a-n may be able to broadcast a message to all of the other directors 37a-n over the internal fabric 30 at the same time. Each of the components of system 20a may be configured to communicate over internal fabric 30 in accordance with one or more technologies such as, for example, InfiniBand (IB), Ethernet, Gen-Z, another technology, or any suitable combination of the foregoing.

The GM portion 25b may be used to facilitate data transfers and other communications between the directors 37a-n in a storage system. In one embodiment, the directors 37a-n (e.g., serving as FAs or BEs) may perform data operations using a cache 28 that may be included in the GM 25b, for example, in communications with other directors, and other components of the system 20a. The other portion 25a is that portion of memory that may be used in connection with other designations that may vary in accordance with each embodiment. Global memory 25b and cache 28 are described in more detail elsewhere herein. It should be appreciated that, although memory 26 is illustrated in FIG. 1 as being a single, discrete component of storage system 20a, the invention is not so limited. In some embodiments, memory 26, or the GM 25b or other memory 25a thereof, may be distributed among a plurality of physically discrete processing nodes (e.g., circuit boards) as described in more detail elsewhere herein.

In at least one embodiment, write data received at the storage system from a host or other client may be initially written to cache 28 and marked as write pending. For example, cache 28 may be partitioned into one or more portions called cache slots (which also may be referred to in the field of data storage as cache lines, cache blocks or another name), which may be a of a predefined uniform size, for example, 128 Kbytes. Write data of a write operation received at the storage system may be initially written (i.e., staged) in one or more of these cache slots and marked as write pending. Once written to cache 28, the host (e.g., one of 14a-n) may be notified that the write operation has completed. At a later time, the write data may be de-staged from cache 28 to one or more PSDs 24a-n, such as by a BE.

The memory 26 may include persistent memory for which for which data stored thereon persists after the process or program that created the data terminates. For example, at least portions of the memory 26 may be implemented using DIMM (or another type of fast RAM memory) that is battery-backed by a NAND-type memory (e.g., flash). In some embodiments, the data in such persistent memory may persist (for at least some period of time) after the storage system fails. The memory 26 (or at least a portion thereof—e.g., the cache 28 or a portion thereof) may be configured such that each data written to the memory 28 is mirrored to provide a form of write protection. For example, each memory location within each such mirrored portion of the memory 26 may have a corresponding memory location on the storage system 20a to which a redundant copy of the data is stored, and which can be used in place of the mirrored memory location in the event the mirrored memory location fails. The redundant memory location should be located outside of at least the most local fault zone of the mirrored memory location. In some embodiments described in more detail herein, the memory 26 may be distributed among multiple physically discrete processing nodes (e.g., circuit boards), in which case mirroring may be configured such that a mirrored memory location and its corresponding redundant memory location are located on different physically discrete processing nodes.

Storage system 20a may include a back-up power supply 41 (e.g., a battery) that can provide power to the storage system for a limited amount of time to after primary (AC) power fails. This limited time may allow certain tasks to be performed during a window of time beginning when the primary power fails until the earliest of: the primary power is restored; and the end of the limited lifetime (sometimes on the order of second or tens of seconds) of the back-up power supply. For example, the storage system 20a (e.g., the memory 26 and/or memory management module 32) may be configured to automatically copy the contents of the memory 26 during this window of time to one or more predetermined PSDs, to be restored to the memory 26 after the power has been restored, e.g., as part of the storage system recovering process. Such automatic copying for restoration during recovering may referred to herein as "vaulting." Vaulting may provide a form of write protection for data written to the memory 26, for example, for dirty data in the cache 28; i.e., data written to the storage system, which has been staged in the cache 28 but not yet de-staged to a PSD. More broadly, vaulting may be performed for any data written to the memory 26.

The storage system 20a may include a memory management module 32 configured to manage one or more aspects of the memory 26, and the memory management module 32 may include a cache management module 34 for managing one or more aspects of the cache 28.

It should be noted that, although examples of techniques herein may be made with respect to a physical storage system and its physical components (e.g., physical hardware for each RA, BE, FA and the like), techniques herein may be performed in a physical storage system including one or more emulated or virtualized components (e.g., emulated or virtualized ports, emulated or virtualized BEs or FAs), and also a virtualized or emulated storage system including virtualized or emulated components. For example, in embodiments in which NVMe technology is used to communicate with, and transfer data between, a host system and one or more FAs, one or more of the FAs may be implemented using NVMe technology as an emulation of an FC adapter.

Figure 2:
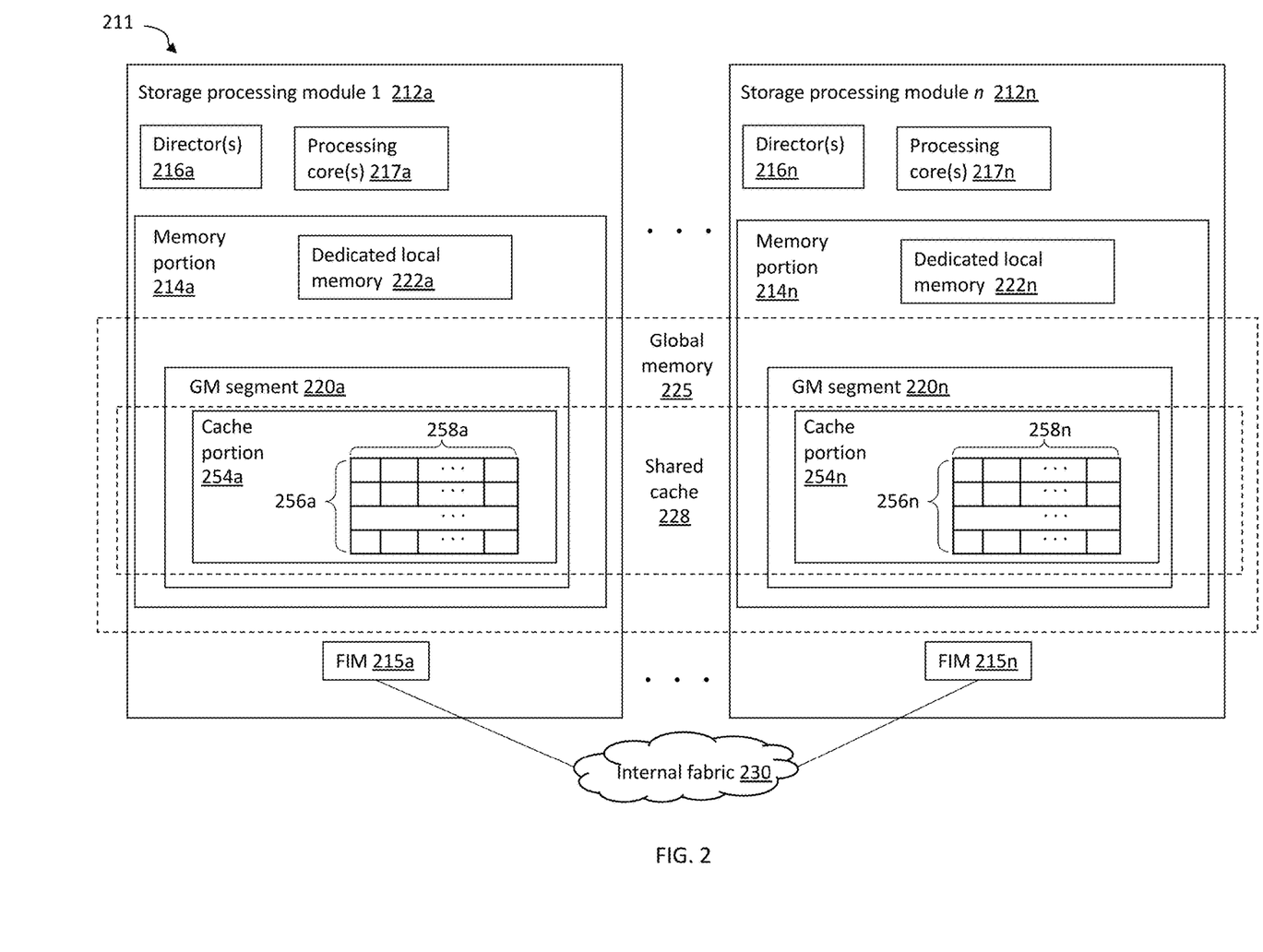
FIG. 2 is a block diagram illustrating an example of a storage system including multiple physically discrete storage processing nodes, according to embodiments of the invention.

Any of storage systems 20a-n, or one or more components thereof, described in relation to FIGS. 1-2 may be implemented using one or more Symmetrix™, VMAX™, VIVIAX3™ or PowerMax™ systems made available from Dell EMC.

Host systems 14a-n may provide data and control (e.g., management and access control) information to storage systems 20a-n over a plurality of IO paths defined between the host systems and storage systems, for example, including host system components, storage system components, and network components (e.g., of network 18), and the storage systems also may provide data to the host systems across the IO paths. In the embodiment of FIG. 1, the host systems may not address the PSDs (e.g., disk drives or flash drives) 24 of the storage systems directly, but rather access to data may be provided to one or more host systems from what the host systems view as a plurality of LSUs including, for example, logical blocks, logical devices (also referred to as logical volumes, LUNs, logical storage units and/or logical disks), thin devices, groups of logical devices (e.g., storage groups), NVMe namespaces, and other types of LSUs. For example, a PowerMax storage system may be configured to organize available storage resources (e.g., PSDs) into many LUNs, each with its own addressable space defined in logical blocks addresses (LBAs). The LSUs may or may not correspond to the actual PSDs. For example, one or more LSUs may map to a single PSD; that is, the logical address space of the one or more LSU may map to physical space on a single PSD. Data in a single storage system may be accessed by multiple hosts allowing the hosts to share the data residing therein. The FAs may be used in connection with communications between a storage system and a host system. The RAs may be used in facilitating communications between two storage systems. The BEs may be used in connection with facilitating communications to the associated PSD(s) based on LSU(s) mapped thereto.

FIG. 2 is a block diagram illustrating an example of at least a portion 211 of a storage system (e.g., 20a) including multiple, physically discrete storage processing nodes (e.g., circuit boards) 212a-212n, which may be referred to herein as "storage processing modules." Storage system 211 may include a plurality of storage processing modules 212a-212n and a fabric 230 (e.g., internal fabric 30) over which the storage processing modules 212a-n may communicate. Each of the storage processing modules 212a-212n may include components thereon as illustrated. The fabric 230 may include, for example, one or more switches and connections between the switch(es) and storage processing modules 212a-212n. In at least one embodiment, the fabric 230 may be an IB fabric. In some embodiments, multiple processing 212a-n nodes may be implemented on a single physically discrete component; e.g., two storage processing modules 212a-n may be implemented on single engine of PowerMax storage system.

In the following paragraphs, further details are described with reference to storage processing module 212a but each of the N storage processing modules in a system may be similarly configured. For example, storage processing module 212a may include any of: one or more directors 216a (e.g., directors 37a-n); memory portion 214a; one or more processing cores 217a including compute resources, for example, as part of a CPUs and/or a CPU complex for processing IO operations; and a fabric interface module (FIM) 215a for interfacing the storage processing module 212a to an internal fabric 230. Each director 216a may be configured to operate, such as by executing code, as any one or more of an FA, BE, RA, and the like. In some embodiments, each of the directors, or a portion thereof, are implemented in software stored in a memory portion 214a (e.g., in a dedicated local memory 222a) that is executed by one or more of the processing cores 217a. Such software implementation of directors may be considered emulations of types of physical directors (i.e., directors implemented (at least primarily) in hardware).

Each FIM 215a-n may include one or more host channel adapters (HCAs) that physically couple, and are configured to enable communication between, its respective storage processing module 212a-n, and the internal fabric 230. In some embodiments, the internal fabric 230 may include multiple (e.g., 2) switches, and each HCA 215a-n may have multiple (e.g., 2) ports, each one connected directly to one of the switches.

Each of the storage processing modules 212a-n may, respectively, also include memory portions 214a-n. The memory portion of each storage processing module may be characterized as locally accessible with respect to that particular storage processing module, and more specifically with respect to other components on the same storage processing module. For example, storage processing module 212a includes memory portion 214a which is memory that is local to that particular storage processing module 212a. Data stored in memory portion 214a may be directly accessed by any of the processing cores 217a (e.g., executing instructions on behalf of one of the directors 216a) of the storage processing module 212a. For example, memory portion 214a may be a fast memory (e.g., DIMM (dual inline memory module) DRAM (dynamic random access memory)) that is locally accessible by a director 216a, where data from one location in 214a may be copied to another location in 214a directly using DMA operations (e.g., local memory copy operations) issued by director 216a. Thus, the director 216a may directly access data of 214a locally without communicating over the fabric 230.

The memory portions 214a-214n of storage processing modules 212a-n may be further partitioned into different portions or segments for different uses. For example, each of the memory portions 214a-214n may respectively include GM segments 220a-n configured for collective use as segments of a distributed GM, for example, GM 225 (e.g., GM 25b). Thus, data stored in any GM segment 220a-n may be accessed by any director 216a-n on any storage processing module 212a-n. Additionally, each of the memory portions 214a-n may respectively include dedicated local memories 222a-n. Each of the dedicated local memories 222a-n are respectively configured for use locally by the one or more directors 216a-n, and possibly other components, residing on the same single storage processing module. In at least one embodiment where there is a single director denoted by 216a (and generally by each of 216a-n), data stored in the dedicated local memory 222a may be accessed by the respective single director 216a located on the same storage processing module 212a. However, the remaining directors located on other ones of the N storage processing modules may not access data stored in the dedicated local memory 222a.

To further illustrate, GM segment 220a may include information such as user data stored in the cache portion 220a, metadata, and the like, that is accessed (e.g., for read and/or write) generally by any director of any of the storage processing modules 212a-n. Thus, for example, any director 216a-n of any of the storage processing modules 212a-n may communicate over the fabric 230 to access data in GM segment 220a. In a similar manner, any director 216a-n of any of the storage processing modules 212a-n may generally communicate over fabric 230 to access any GM segment 220a-n of the distributed GM. Although a particular GM segment, such as 220a, may be locally accessible to directors on one particular storage processing module, such as 212a, any director of any of the storage processing modules 212a-n may generally access the GM segment 220a. Additionally, the director 216a also may use the fabric 230 for data transfers to and/or from GM segment 220a even though 220a is locally accessible to director 216a (without having to use the fabric 230).

Also, to further illustrate, dedicated local memory 222a may be a segment of the memory portion 214a on storage processing module 212a configured for local use solely by components on the single/same storage processing module 212a. For example, dedicated local memory 222a may include data described in following paragraphs which is used and accessed only by directors 216a included on the same storage processing module 212a as the dedicated local memory 222a. In at least one embodiment in accordance with techniques herein and as described elsewhere herein, each of the dedicated local memories 222a-n may include a local page table or page directory used, respectively, by only director(s) 216a-n local to each of the storage processing modules 212a-n.

In such an embodiment as in FIG. 2, the GM segments 220a-n may be logically concatenated or viewed in the aggregate as forming one contiguous GM logical address space of a distributed GM. In at least one embodiment, the distributed GM formed by GM segments 220a-n may include the cache portion 254a, various metadata and/or structures, and other information, as described in more detail elsewhere herein. Consistent with discussion herein, the cache portion 254a, having cache slots allocated from GM segments 220a-n, may be used to store IO data (e.g., for servicing read and write operations).

Each cache portion 254a-n may be a portion of a shared cache 228 (e.g., cache 28) distributed across the storage processing modules 212a-n, where the shared cache 228 may be considered a part of the GM 225. The cache portion 254a-n may include a plurality of cache slots 256a-n, each cache slot including one or more (e.g., 16) sections 258a-n. Each cache slot 256a-n may be of a uniform size (e.g., 128 KB) and each section may be of a uniform size (e.g., 8 KB). It should be appreciated that cache slot sizes and section sizes other than 128 KB and 8 KB, and a quantity of sections other than 16, may be used.

In an embodiment, the storage system as described may be characterized as having one or more logical mapping layers in which an LSU of the storage system is exposed to the host whereby the LSU is mapped by such mapping layers of the storage system to one or more PSDs. Additionally, the host also may have one or more additional mapping layers so that, for example, a host-side LSU may be mapped to one or more storage system LSUs as presented to the host.

Any of a variety of data structures may be used to process 10 on storage system 20a, including data structures to manage the mapping of LSUs and locations thereon to PSDs and locations thereon. Such data structures may be stored in any of memory 26, including GM 25b and memory 25a, GM segment 220a-n and/or dedicated local memories 22a-n. Thus, storage system 20a, and storage system 620a described in more detail elsewhere herein, may include memory elements (e.g., cache) that hold data stored on PSDs or that is currently held ("staged") and will be stored ("de-staged") to PSDs, and memory elements that store metadata (e.g., any of the metadata described herein) associated with such data. Illustrative examples of data structures for holding such metadata will now be described.

Figure 3:
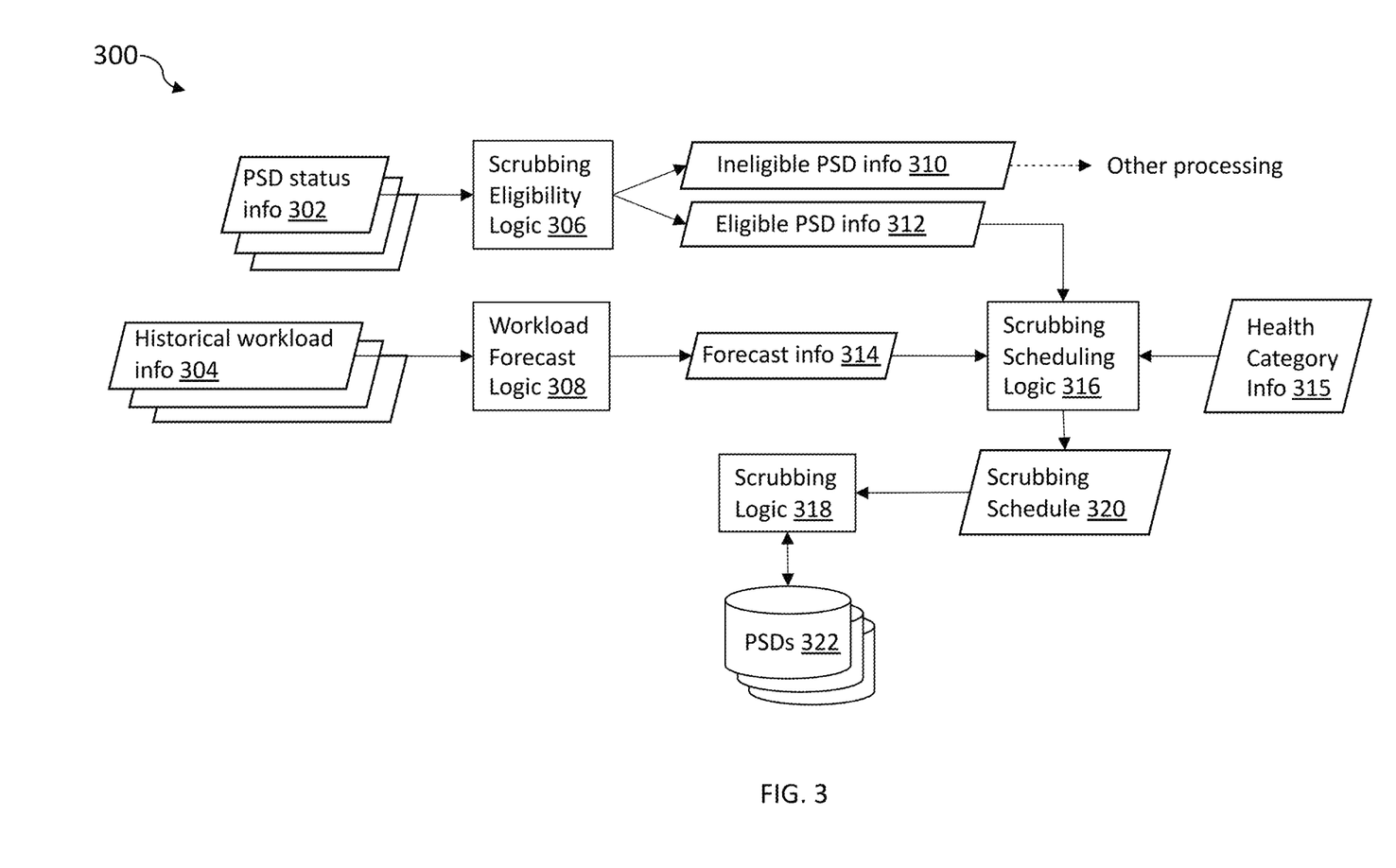
FIG. 3 is a data flow diagram illustrating an example of a system for managing the scrubbing of physical storage devices, according to embodiments of the invention.

FIG. 3 is a data flow diagram illustrating an example of a system 300 for managing the scrubbing of PSDs, according to embodiments of the invention. Other embodiments of a system for managing the scrubbing of PSD, for example, variations of the system 300, are possible and are intended to fall within the scope of the invention. The system 300 may be implemented on (e.g., integrated within) the storage system 20a.

The system 300 may include any of: scrubbing eligibility logic (SEL) 306; workload forecast logic (WFL) 308; scrubbing schedule logic (SSL) 316; scrubbing logic 318, PSDs 322; other components; or any suitable combination of the foregoing. The SEL 306 may receive PSD status information 302; and determine and output ineligible PSD information 310 and eligible PSD information 312.

The PSD status information 302 may include, for each PSD of the storage system, values of one or more PSD parameters. For example, the PSD status information may include SMART (Self-Monitoring, Analysis and Reporting Technology, aka S.M.A.R.T.) data and/or Background Media Scan (BMS) data. In some embodiments, the SEL 306 may include selection logic to select, from among the PSD status information 302, PSD parameters pertinent to determining PSD health, including, for example, imminent PSD failure. Such PSD parameters may include, for example, medium_err, disk_reallocated, disk_tempc, uncorr, rd_err, uncorr_wrt_err, phy_err_other, start_stop_count, disk_busy, log_cnt, range_days, power_on_hours, reco_err_uniq, recov_err_uniq, and err head. Such selection logic may be configured to select certain parameters automatically, based on statistical analysis, and/ or based on user input. Such selected PSD parameters may be referred to herein as "pre-selected PSD parameters."

The type and/or manufacturer of PSDs may vary from PSD to PSD, and, consequently, parameters for which values are available may vary from PSD to PSD. Thus, in some embodiments, the pre-selected PSD parameters may be selected to be common to any PSDs that are installed (or may later be installed) on the storage system, and the pre-selected PSD parameters may be changed over time, based on a change in PSDs installed on the storage system or for other reasons. For example, it may be determined over time that some PSD parameters that are being used are not good indicators of PSD health (or at least worse indicators than some PSD parameters currently not being used) and other PSD parameters that are not being used are good indicators of health (or at least better indicators than some PSD parameters currently being used), in which case the PSD parameters used may be changed accordingly.

In some embodiments, the values provided for a given parameter may vary from PSD to PSD (e.g., based on type and/or manufacturer). For example, for one or more parameters, one or more first vendors may use the metric system, whereas one or more second vendors may not, and/or one or more vendors may use a range of values from 0-10 whereas one or more other vendors may use a range of values from 1-3. Accordingly, the SEL 306 may be configured with normalizing logic to normalize the parameter values received as part of the PSD status information 302.

The SEL 306 may be configured to determine, based on the PSD status information, which PSDs of the storage system are eligible for scrubbing, and which PSDs are ineligible for scrubbing. For example, the SEL 306 may be configured to classify each PSD as eligible or ineligible for one or more periods of time in the future, wherein, for each period of time, such classification may be indicative of a predicted health of the PSD during that period of time. For example, the SEL 306 may be configured to proactively predict (e.g., n-days ahead) the health of a PSD as "GOOD" (healthy) or "BAD" (not healthy). For each PSD, such prediction may include determining a degree of similarity between the values of the pre-selected parameters for the PSD and: the values of the of the pre-selected parameters for PSDs previously classified as eligible for scrubbing; and the values of the of the pre-selected parameters for PSDs previously classified as ineligible for scrubbing.

Any of a variety of algorithms and computation techniques may be employed to perform such classification, including, for example, ML, DL, statistical analysis, conformal prediction, other techniques and/or algorithms, or any suitable combination of the foregoing. Unlike some predictive classification techniques in which classification is made (e.g., a label is determined) based on a calculation of a probability of a classification, conformal prediction may employ hypothesis testing, algorithmic randomness and transductive inference to quantify a classification. Performing conformal prediction may involve applying a classification algorithm, for example, K-nearest neighbor, Random Forest, Online Support Vector Machine (Online SVM), Online Stochastic Gradient Descent (Online SGD), other classification algorithms, or any suitable combination of the foregoing to calculate a p-value for each potential classification (for example, eligible (e.g., good) and ineligible (e.g., bad)), where each p-value can be considered to represent a value reflecting a tested hypothesis of a respective potential classification.

For example, the p-value for each potential classification may be determined by application of Equation 1.

$$p_y = \frac{\text{number of } i \text{ such that } 1 \le i \le n \text{ and } \alpha_i^y \ge \alpha_n^y}{n} \quad \text{Equation 1}$$

where n is total number of PSDs including the PSD whose eligibility (e.g., health) is being predicted, i is the $i^{th}$ PSD such that $1 \le i \le n$, $\alpha_i^y$ is the non-conformity score of $i^{th}$ PSD for label (i.e., classification) y (for example, y=eligible, e.g., good health; or y=ineligible, e.g., bad health), $\alpha_n^y$ is the non-conformity score of $n^{th}$ PSD for label y, and $p_y$ is the p-value for label y (i.e., for the hypothesis of y=eligible or y=ineligible) for the PSD whose prediction label is to be determined.

The non-conformity score of each PSD of the storage system for a hypothesized label may be defined by Equation 2:

$$\alpha_i^y = \frac{\sum_{j=1}^{k} D_{ij}^y}{\sum_{j=1}^{k} D_{ij}^{-y}} \quad \text{Equation 2}$$

where $\sum_{j=1}^{k} D_{ij}^y$ is the distance to the $i^{th}$ PSD nearest neighbor with the same label, $\sum_{j=1}^{k} D_{ij}^{-y}$ is the distance to the $i^{th}$ PSD nearest neighbor with a different label. For example, if the hypothesis is y=ineligible (e.g., bad health), the non-conformity score ($\alpha_i^y$) of the PSD is the non-conformity score assuming that the PSD is ineligible; and if the hypothesis is y=eligible (e.g., good health), the non-conformity score ($\alpha_i^y$) of the PSD is the non-conformity score assuming that the PSD is eligible. The non-conformity measure of each individual PSD for each hypothesized label with respect to each other PSD may be described as the ratio of "similar label (y) and near distance (k=1)" to the "dissimilar label (−y) and far distance" from $i^{th}$ PSD.

In some embodiments, the SEL 306 classifies a PSD (e.g., for a future time period) as ineligible if a p-value determined for ineligibility is greater than a p-value determined for eligibility, and classifies the PSD as eligible if a p-value determined for eligibility is greater than a p-value determined for ineligibility.

Figure 4:
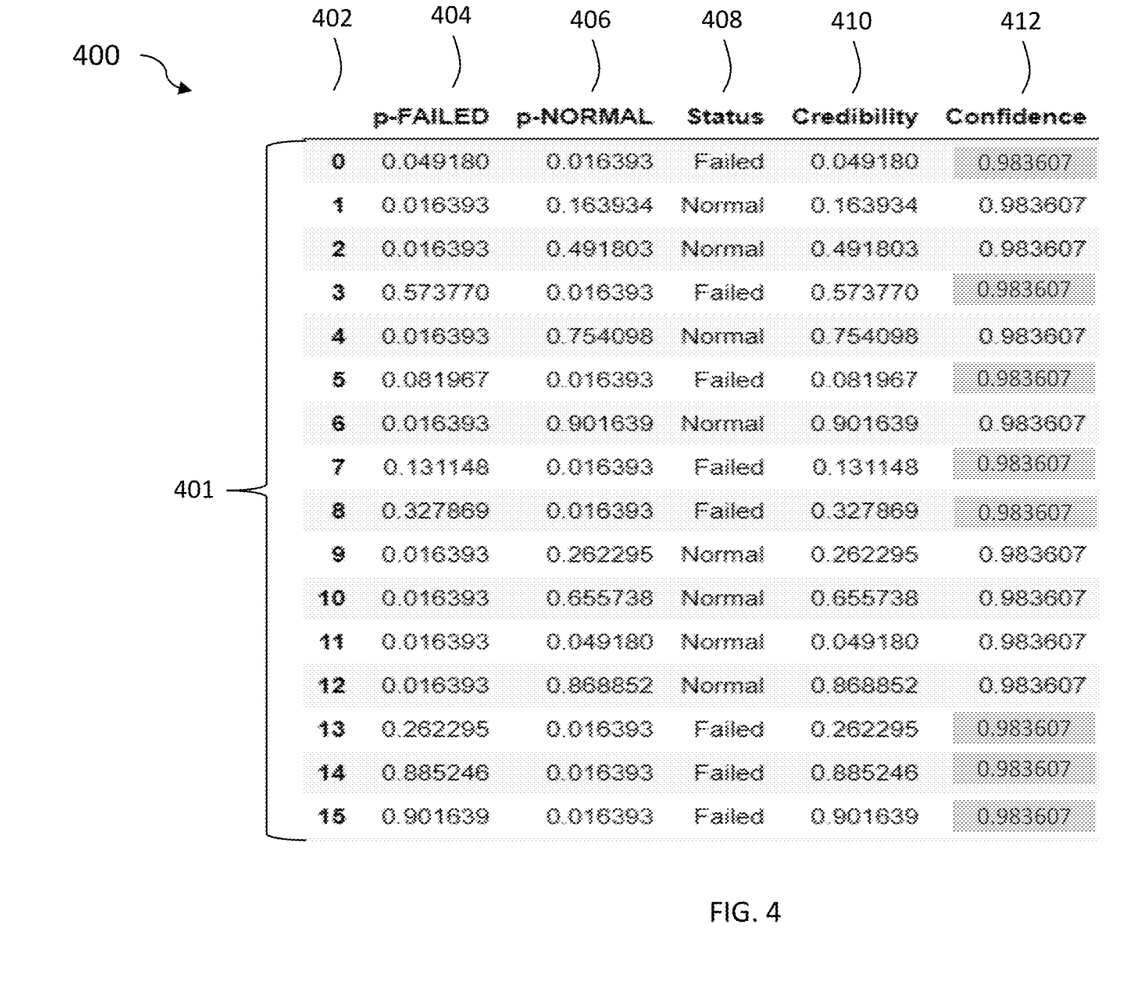
FIG. 4 includes a table illustrating an example of scrubbing eligibility information, according to embodiments of the invention.

FIG. 4 includes a table 400 illustrating an example of scrubbing eligibility information, according to embodiments of the invention, which may have been generated by the SEL 306. It should be appreciated that other eligibility information may be provided, including variations of the information illustrated in the table 400, which is intended to fall within the scope of the invention. The eligibility information in the data structure 400 may have been generated for a certain future time period, for example, 7 days into the future from when it was generated (i.e., from current time).

The table 400 may include a plurality of entries 401, each entry corresponding to a PSD, representing eligibility information determined for the PSD. Each entry may specify, for the PSD corresponding to the entry: a PSD ID in a column 402, a generated p-value for a potential classification of ineligibility (e.g., failed) in a column 404; a generated p-value for a potential classification of eligibility (e.g., normal) in a column 406; a determined classification (e.g., status) in a column 408; a determined credibility value in a column 410; and a determined confidence value in a column 412. The entries 401 are ordered according to PSD ID.

Entries 401 that have a classification of ineligible (e.g., "failed") as indicated in the column 408 have a confidence value in column 412 highlighted in gray. As can be gleaned from inspection of the values in columns 404, 406 and 408, in this embodiment, a PSD is classified as ineligible if a p-value determined for ineligibility is greater than a p-value determined for eligibility, and classified as eligible if a p-value determined for eligibility is greater than a p-value determined for ineligibility.

Returning to FIG. 3, in some embodiments, in addition to classifying a PSD as eligible or ineligible for scrubbing, the SEL 306 also determines a relative eligibility for each eligible PSD relative to other eligible PSDs, and may include ranking logic to rank the eligible PSDs according to their relative eligibilities. For example, in embodiments in which conformal prediction is employed, applying conformal prediction may include, for each PSD, calculating one or more uncertainty estimations with respect to a classification. The uncertainty estimation of a classification may include a credibility and confidence of the classification, where: credibility=$p_{max}$, and confidence=$1-p_{2nd\ max}$, where $p_{max}$ is the maximum p-value determined from among the potential classifications, and $p_{2nd\ max}$ is the second highest p-value determined from among the potential classifications. In embodiments in which there are only two potential classifications (e.g., scrubbing eligible or scrubbing ineligible), $p_{2nd\ max}$ is the value of the only other p-value determined.

In embodiments in which conformal prediction is employed, the confidence value calculated for a PSD may serve as the relative eligibility value of a PSD.

The ineligible PSD information 310 generated by the SEL 306 may include a list of PSDs determined to be ineligible, and may include other information about the PSDs, for example, the relative eligibility value of the PSD. In some embodiments, a classification of ineligible may be indicative of the PSD deemed to be of such low health that, rather than be scrubbed, the PSD should be taken off-line, for example, for further analysis and repair or to be discarded.

The eligible PSD information 312 generated by the SEL 306 may include a list of PSDs determined to be eligible and may include other information about the PSDs, for example, the relative eligibility value of the PSD. In some embodiments, the eligible PSDs included in the eligible PSD information 312 are ranked according to their relative eligibilities and listed according to such rank.

Figure 5:
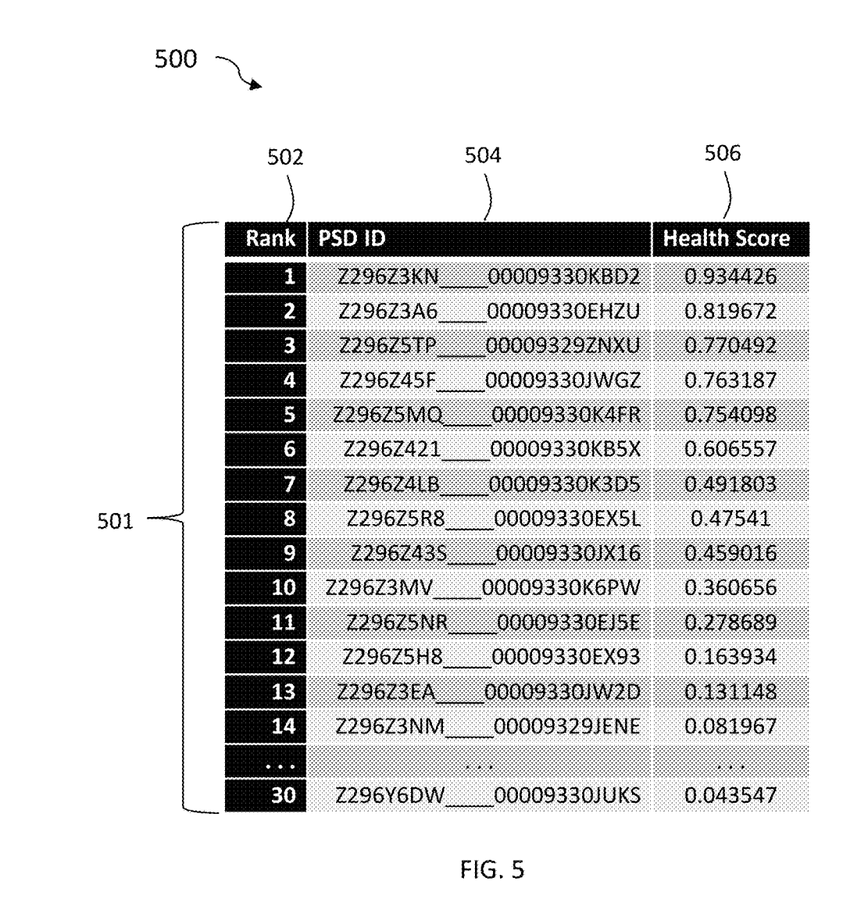
FIG. 5 includes a table illustrating an example of eligible PSD information, according to embodiments of the invention.

FIG. 5 includes a table 500 illustrating an example of eligible PSD information 312, according to embodiments of the invention. It should be appreciated that other eligible PSD information may be provided, including variations of the information illustrated in the table 500, which is intended to fall within the scope of the invention. The information in the table 500 may have been generated for a certain future time period, and may result from selecting eligible PSDs from scrubbing eligibility information like that shown in the table 400 and ranking the eligible PSD according to relative eligibility (e.g., health score).

The table 500 may include a plurality of entries 501, each entry corresponding to an eligible PSD, representing eligibility information determined for the eligible PSD. Each entry may specify, for the PSD corresponding to the entry: a rank, for example, according to relative eligibility (e.g., health score) in a column 502; a PSD ID (e.g., serial number) in a column 504; a health score (or other relative eligibility value) in a column 506; and perhaps other information. The entries 501 may be ordered according to rank, as illustrated in FIG. 5.

Returning to FIG. 3, the WFL 308 may receive historical system workload (i.e., utilization) information 304 and generate workload forecast information 314 for future periods of time. The historical system utilization information 304 may include information regarding various loads on the storage system (e.g., 20a) on which system 300 is implemented, including CPU activity, memory/paging activity, interrupts, device loads, PSD 10 activity, network and swap space utilization, etc., for example, in accordance with System Activity Report (SAR) technology.

The WFL 308 may be configured to determine workload forecast information 314 for any of a variety of granularities of temporal intervals (e.g., seconds, minutes, hours, days, etc.) and for any of a variety of future windows of time (e.g., one or more weeks or months). For example, the WFL 308 may be configured to forecast system workloads for one hour intervals for the next two weeks. The WFL 308 may be configured to use any of a variety of techniques to predict future workloads, including using one or more time series algorithms to predict n-step ahead system utilization. For example, the WLF 308 may be configured to determine probability distributions of system resources over a range of different workload (i.e., utilization) values (e.g., 0-100%) for future temporal intervals (periods), and to include this information in the workload forecast information 314.

The SSL 316 may be configured to receive the workload forecast information 314, the eligible PSD information 312 and health category information 315 and to produce a scrubbing schedule 320. The health category information 315 may include information defining health categories for PSDs based on PSD heath scores, for example, health scores included in the eligible PSD information 312 as described in more detail elsewhere herein. The SSL 316 may include health category logic that provides a user interface enabling a user to define such PSD health categories, and/or the health category logic may be configured to receive the health care information 315 from another source within or external to the storage system. Each PSD health category may be defined by a range of PSD health scores, and may be embodied in a table or other data structure.

Figure 6:
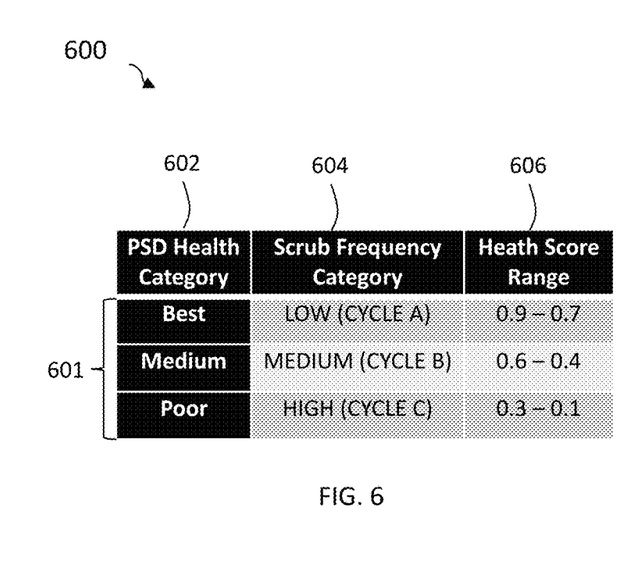
FIG. 6 illustrates an example of a table defining PSD health categories, according to embodiments of the invention.

FIG. 6 illustrates an example of a table 600 defining PSD health categories, according to embodiments of the invention. Other embodiments of a table defining PSD health categories, for example, variations of the table 600, or other data structures defining PSD health categories, are possible and are intended to fall within the scope of the invention.

The table 600 may include a plurality of entries 601, each entry representing a PSD health category. Each entry may specify, for the PSD health category represented by the entry: a name (e.g., Best, Medium, Poor) and/or other ID of the category in a column 602; a scrub frequency category in a column 604; and a heath score range in a column 606; and perhaps other information. In FIG. 6, the table 600 lists three PSD health categories, but it should be appreciated that any number of PSD health categories may be defined and have entries in the table 600.

A plurality of scrub frequency categories may be defined, each scrub frequency category corresponding to a frequency with which scrubbing will be performed. For example, scrub frequency categories may include low (e.g., cycle A), medium (e.g., cycle B), and high (e.g., cycle C), whereas a frequency (e.g., cycle) may be associated with the frequency category, for example, once every one or more days, once every one or more weeks, once every one or more months, etc. One of these plurality of scrub frequency categories may be associated with a PSD health category represented by an entry in the column 604.

Each PSD health category represented by one of the entries 601, and its associated frequency category in the column 604, may be associated with (i.e., mapped to) a health score range specified in the column 604. While only three scrub frequency categories and health score ranges are show in FIG. 6, it should be appreciated that any number of scrub frequency categories and health score ranges may be defined and associated with PSD health categories.

In some embodiments, for example, as illustrated in FIG. 6, the table 600 may associate higher health score ranges with better PSD health scores and lower scrub frequencies. This mapping may reflect a desire to scrub healthier PSDs less frequently than less healthy PSDs; i.e., less healthy PSDs more than healthier PSDs.

Figure 7:
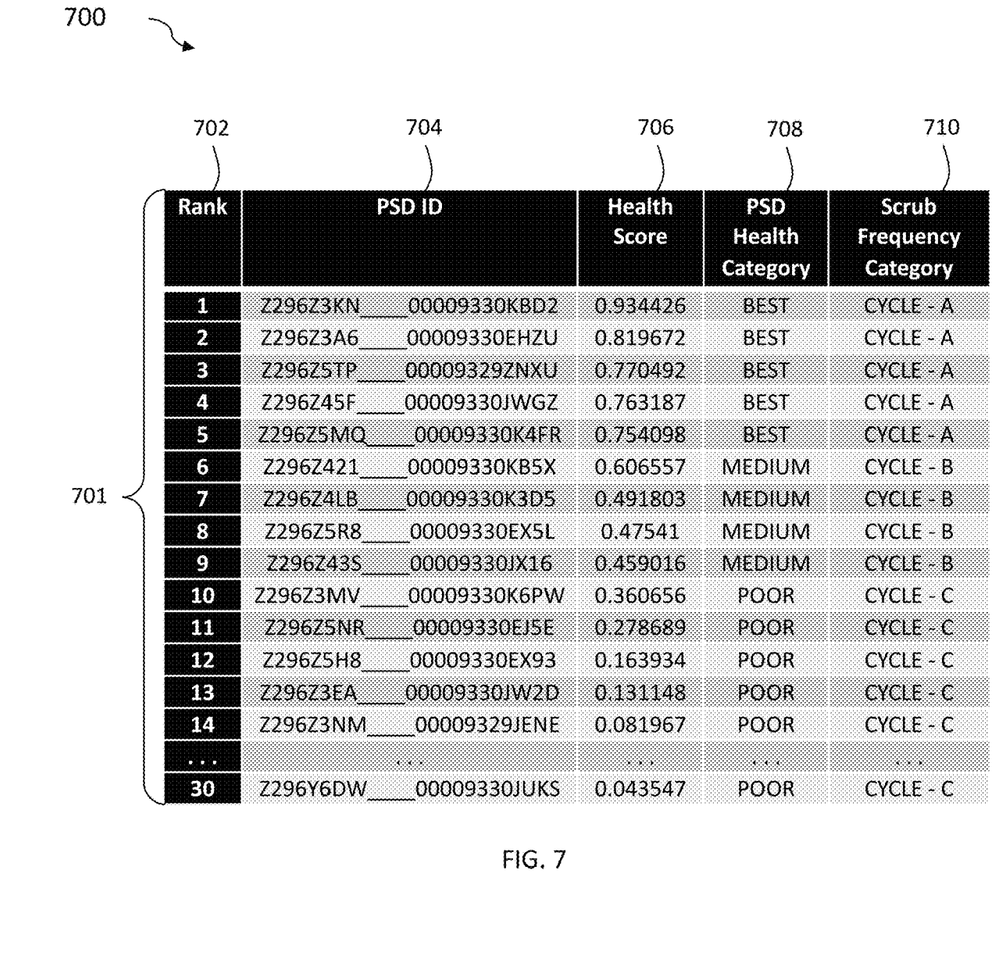
FIG. 7 includes a table illustrating an example of PSDs mapped to scrubbing cycles, according to embodiments of the invention.

Returning to FIG. 3, consider an example of the SSL 316 mapping the PSDs of table 500 to the health categories of table 600. FIG. 7 includes a table 700 illustrating an example of PSDs of the table 400 mapped to the health categories of the table 500, according to embodiments of the invention.

The table 700 may include a plurality of entries 701, each entry corresponding to an eligible PSD. Each entry may specify, for the PSD corresponding to the entry: a rank, for example, according to relative eligibility (e.g., health score) in a column 702; a PSD ID in a column 704; a health score in a column 706; a PSD heath category in a column 708 and a scrub frequency category associated with the PSD health category in a column 710.

The SSL 316 may be configured to schedule scrubbing of PSDs based on the workload forecast information 314 and the mapping of the PSDs to PSD health categories, for example, as reflected in the table 700. In some embodiments, scrubbing is only scheduled during periods of time for which it is forecasted that system workloads will be below a certain threshold (e.g., less than 50% workload capacity). Further, scrubbing may be scheduled such that less scrubbing is performed during periods having heavier forecasted workloads and more scrubbing is performed during periods having lighter forecasted workloads. The scheduled times for scrubbing may be configured to accommodate varying numbers of PSDs in each PSD health category. For example, if relatively high numbers of PSDs are grouped into PSD health categories having a higher scrubbing frequency, this may require different scheduling than if relatively low numbers of PSDs are grouped into PSD health categories having a higher scrubbing frequency.

The scrubbing logic 318 may be configured to receive the scrubbing schedule 320 and perform the scrubbing on eligible PSDs of the PSDs 322, serially or concurrently for two or more eligible PSDs at a time.

Figure 8:
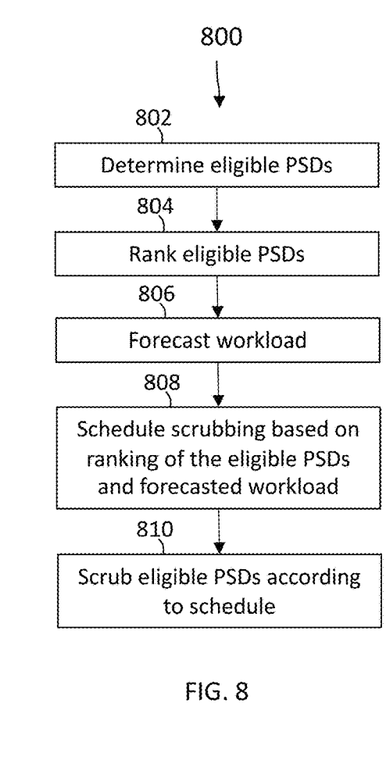
FIG. 8 is a flowchart illustrating an example of a method of managing the scrubbing of physical storage devices, according to embodiments of the invention.

FIG. 8 is a flowchart illustrating an example of a method 800 of managing the scrubbing of PSDs, according to embodiments of the invention. Other embodiments of a method of managing the scrubbing of PSDs, for example, variations of the method 800, are possible and are intended to fall within the scope of the invention. The method 800 may be executed by the system 300.

In a step 802, from a plurality of PSDs of a storage system, a set of two or more (e.g., some or all) of the PSDs may be determined to be eligible for scrubbing, for example, as described in more detail elsewhere herein, including in relation to SEL 306.

In a step 804, the set of eligible PSDs may be ranked, for example, based on determined relative eligibilities between the PSDs, for example, as described in more detail elsewhere herein, including in relation to SEL 306.

In a step 806, the future workload of the storage system during one or more periods of time, may be forecasted, for example, as described in more detail elsewhere herein, including in relation to WFL 308. It should be appreciated that the step 806 may be performed before, after or concurrently to (at least in part), and/or independently of, the steps 802 and 804.

In a step 808, scrubbing of the eligible PSDs may be scheduled based on the ranking of the eligible PSDs and the forecasted workload, for example, as described in more detail elsewhere herein, including in relation to SSL 316.

In a step 810, the eligible PSDs may be scrubbed according to the scrubbing schedule determined in the step 810, for example, as described in more detail elsewhere herein, including in relation to scrubbing logic 318.

Various embodiments of the invention may be combined with each other in appropriate combinations. Additionally, in some instances, the order of steps in the flowcharts, flow diagrams and/or described flow processing may be modified, where appropriate. It should be appreciated that any of the methods described herein, including method 800 or parts thereof, may be implemented using one or more of the systems and/or data structures described in relation to FIGS. 1-7 or components thereof. Further, various aspects of the invention may be implemented using software, firmware, hardware, any suitable combination thereof and/or other computer-implemented modules or devices having the described features and performing the described functions. Logic that when executed performs methods described herein, steps thereof or portions of such methods or steps, may be implemented as software, firmware, hardware, any suitable combination thereof.

Software implementations of embodiments of the invention may include executable code that is stored one or more computer-readable media and executed by one or more processors. Each of the computer-readable media may be non-transitory and include a computer hard drive, ROM, RAM, flash memory, portable computer storage media such as a CD-ROM, a DVD-ROM, a flash drive, an SD card and/or other drive with, for example, a universal serial bus (USB) interface, and/or any other appropriate tangible or non-transitory computer-readable medium or computer memory on which executable code may be stored and executed by a processor. Embodiments of the invention may be used in connection with any appropriate OS.

As used herein, an element or operation recited in the singular and preceded with the word "a" or "an" should be understood as not excluding plural elements or operations, unless such exclusion is explicitly recited. References to "one" embodiment or implementation of the present disclosure are not intended to be interpreted as excluding the existence of additional embodiments that also incorporate the recited features. Furthermore, a description or recitation in the general form of "at least one of [a], [b] or [c]," or equivalent thereof, should be generally construed to include [a] alone, [b] alone, [c] alone, or any combination of [a], [b] and [c]. In addition, use of a an ordinal term, e.g., "first," "second" or the like, to qualify a term for an item having multiple instances of the same name does not necessarily indicated a priority, precedence or temporal order between the instances unless otherwise indicated, but rather such ordinal terms may be used merely to distinguish between the separate instances.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. For a storage system including a plurality PSDs (physical storage devices), a method comprising:
selecting, using a processor, an eligible set of two or more of the plurality of PSDs that are eligible for scrubbing, wherein said selecting the eligible set includes using a processor to select each PSD of the eligible set based on a similarity between characteristics of said each PSD and characteristics of PSDs previously determined to be eligible for scrubbing;
responsive to said selecting, storing, in a memory using a processor, the eligible set of the two or more PSDs eligible for scrubbing;
receiving, using a processor, a health score set of health scores for the two or more PSDs in the eligible set, wherein the health score set identifies, for each PSD in the eligible set, a corresponding health score in the health score set;
receiving, using a processor and in accordance with the health score set, a relative eligibility for each PSD of the eligible set relative to other PSDs of the eligible set;
receiving, using a processor, a table defining PSD health categories with associated health score ranges and associated scrub frequency categories, wherein each PSD health category is associated with a corresponding one of the associated health score ranges and is associated with a corresponding one of the associated scrub frequency categories;
for each PSD of the eligible set, mapping, using a processor, said each PSD to one of the PSD health categories and one of the scrub frequency categories associated with said one PSD health category, wherein said mapping is performed in accordance with the health score set and in accordance with the table, wherein a first of the PSD health categories is associated with a first of the scrub frequency categories and a second of the PSD health categories is associated with a second of the scrub frequency categories, wherein the first PSD health category denotes a healthier PSD state than the second PSD health category, and wherein the second scrub frequency denotes a higher scrub frequency than the first scrub frequency, wherein a first PSD of the eligible set has a first health score of the health score set which is mapped by said mapping to the first PSD health category, wherein a second PSD of the eligible set has a second health score of the health score set which is mapped by said mapping to the second PSD health category, and wherein the first PSD is healthier than the second PSD as indicated by the first health score of the first PSD being greater than the second health score of the second PSD;
scheduling, using a processor and in accordance with a schedule, scrubbing of the eligible set of PSDs, including, for each PSD of the eligible set, scheduling a scrubbing of said each PSD based on the relative eligibility of said each PSD and based on a particular one of the scrub frequency categories mapped to said each PSD by said mapping, wherein the schedule indicates to scrub the second PSD, which is less healthy than the first PSD, more frequently than said first PSD; and
scrubbing, using a processor, the eligible set of PSDs according to the schedule, wherein said scrubbing scrubs the second PSD, which is less healthy than the first PSD, more frequently than said first PSD, and wherein said scrubbing includes detecting a media error and corrupted data, and reconstructing the corrupted data into a corresponding proper form.

2. The method of claim 1, wherein said scheduling the scrubbing of the eligible set of PSDs includes, for each PSD of the set, scheduling a frequency of scrubbing of said each PSD based on the relative eligibility of said each PSD.

3. The method of claim 1, further comprising:
predicting, using a processor, amounts of workload activity on the storage system during future time periods,
wherein the scrubbing of the eligible set of PSDs is scheduled based on the predicted amounts of workload activity.

4. The method of claim 1, further comprising:
ranking, using a processor, the PSDs of the eligible set in an order according to the relative eligibility of the PSDs,
wherein the scrubbing of the eligible set of PSDs is based on the order.

5. The method of claim 1, further comprising:
performing, using a processor, conformal prediction analysis on the plurality of PSDs, which includes determining the eligible set using a processor.

6. The method of claim 5, wherein said determining the eligible set includes, for each PSD of the plurality of PSDs, classifying said each PSD using a processor as either eligible for scrubbing or not eligible for scrubbing.

7. The method of claim 6, wherein said performing conformal prediction analysis includes calculating, using a processor for each PSD of the eligible set of PSDs, a confidence in the classification of said each PSD as eligible for scrubbing, wherein the calculated confidence serves as the health score and the relative eligibility of said each PSD.

8. A storage system comprising:
a plurality PSDs (physical storage devices);
one or more processors; and
one or more memories comprising code stored thereon, that when executed by at least one of the one or more processors, performs a method including:
selecting an eligible set of two or more of the plurality of PSDs that are eligible for scrubbing, wherein said selecting the eligible set includes selecting each PSD of the eligible set based on a similarity between characteristics of said each PSD and characteristics of PSDs previously determined to be eligible for scrubbing;
responsive to said selecting, storing in a memory, the eligible set of the two or more PSDs eligible for scrubbing;
receiving a health score set of health scores for the two or more PSDs in the eligible set, wherein the health score set identifies, for each PSD in the eligible set, a corresponding health score in the health score set;
receiving, in accordance with the health score set, a relative eligibility for each PSD of the eligible set relative to other PSDs of the eligible set;
receiving a table defining PSD health categories with associated health score ranges and associated scrub frequency categories, wherein each PSD health category is associated with a corresponding one of the associated health score ranges and is associated with a corresponding one of the associated scrub frequency categories;
for each PSD of the eligible set, mapping said each PSD to one of the PSD health categories and one of the scrub frequency categories associated with said one PSD health category, wherein said mapping is performed in accordance with the health score set and in accordance with the table, wherein a first of the PSD health categories is associated with a first of the scrub frequency categories and a second of the PSD health categories is associated with a second of the scrub frequency categories, wherein the first PSD health category denotes a healthier PSD state than the second PSD health category, and wherein the second scrub frequency denotes a higher scrub frequency than the first scrub frequency, wherein a first PSD of the eligible set has a first health score of the health score set which is mapped by said mapping to the first PSD health category, wherein a second PSD of the eligible set has a second health score of the health score set which is mapped by said mapping to the second PSD health category, and wherein the first PSD is healthier than the second PSD as indicated by the first health score of the first PSD being greater than the second health score of the second PSD;

scheduling, in accordance with a schedule, scrubbing of the eligible set of PSDs, including, for each PSD of the eligible set, scheduling a scrubbing of said each PSD based on the relative eligibility of said each PSD and based on a particular one of the scrub frequency categories mapped to said each PSD by said mapping, wherein the schedule indicates to scrub the second PSD, which is less healthy than the first PSD, more frequently than said first PSD; and scrubbing the eligible set of PSDs according to the schedule, wherein said scrubbing scrubs the second PSD, which is less healthy than the first PSD, more frequently than said first PSD, and wherein said scrubbing includes detecting a media error and corrupted data, and reconstructing the corrupted data into a corresponding proper form.

9. The storage system of claim 8, wherein said scheduling the scrubbing of the eligible set of PSDs includes, for each PSD of the set, scheduling a frequency of scrubbing of said each PSD based on the relative eligibility of said each PSD.

10. The storage system of claim 8, wherein the method further comprises:
predicting amounts of workload activity on the storage system during future time periods, wherein the scrubbing of the eligible set of PSDs is scheduled based on the predicted amounts of workload activity.

11. The storage system of claim 8, wherein the method further comprises:
ranking the PSDs of the eligible set in an order according to the relative eligibility of the PSDs, wherein the scrubbing of the eligible set of PSDs is based on the order.

12. The storage system of claim 8, wherein the method further comprises:
performing conformal prediction analysis on the plurality of PSDs, which includes determining the eligible set.

13. The storage system of claim 12, wherein said determining the eligible set includes, for each PSD of the plurality of PSDs, classifying said each PSD as either eligible for scrubbing or not eligible for scrubbing.

14. The storage system of claim 13, wherein said performing conformal prediction analysis includes calculating, for each PSD of the eligible set of PSDs, a confidence in the classification of said each PSD as eligible for scrubbing, wherein the calculated confidence serves as the health score and the relative eligibility of said each PSD.

15. For a storage system including a plurality of PSDs (physical storage devices), computer-readable media having code stored thereon that, when executed, performs a method of managing scrubbing of PSDs, the method comprising:

selecting, using a processor, an eligible set of two or more of the plurality of PSDs that are eligible for scrubbing, wherein said selecting the eligible set includes using a processor to select each PSD of the eligible set based on a similarity between characteristics of said each PSD and characteristics of PSDs previously determined to be eligible for scrubbing;

responsive to said selecting, storing, in a memory using a processor, the eligible set of the two or more PSDs eligible for scrubbing;

receiving, using a processor, a health score set of health scores for the two or more PSDs in the eligible set, wherein the health score set identifies, for each PSD in the eligible set, a corresponding health score in the health score set;

receiving, using a processor and in accordance with the health score set, a relative eligibility for each PSD of the eligible set relative to other PSDs of the eligible set;

receiving, using a processor, a table defining PSD health categories with associated health score ranges and associated scrub frequency categories, wherein each PSD health category is associated with a corresponding one of the associated health score ranges and is associated with a corresponding one of the associated scrub frequency categories;

for each PSD of the eligible set, mapping, using a processor, said each PSD to one of the PSD health categories and one of the scrub frequency categories associated with said one PSD health category, wherein said mapping is performed in accordance with the health score set and in accordance with the table, wherein a first of the PSD health categories is associated with a first of the scrub frequency categories and a second of the PSD health categories is associated with a second of the scrub frequency categories, wherein the first PSD health category denotes a healthier PSD state than the second PSD health category, and wherein the second scrub frequency denotes a higher scrub frequency than the first scrub frequency, wherein a first PSD of the eligible set has a first health score of the health score set which is mapped by said mapping to the first PSD health category, wherein a second PSD of the eligible set has a second health score of the health score set which is mapped by said mapping to the second PSD health category, and wherein the first PSD is healthier than the second PSD as indicated by the first health score of the first PSD being greater than the second health score of the second PSD;

scheduling, using a processor and in accordance with a schedule, scrubbing of the eligible set of PSDs, including, for each PSD of the eligible set, scheduling a scrubbing of said each PSD based on the relative eligibility of said each PSD and based on a particular one of the scrub frequency categories mapped to said each PSD by said mapping, wherein the schedule indicates to scrub the second PSD, which is less healthy than the first PSD, more frequently than said first PSD; and scrubbing, using a processor, the eligible set of PSDs according to the schedule, wherein said scrubbing scrubs the second PSD, which is less healthy than the first PSD, more frequently than said first PSD, and wherein said scrubbing includes detecting a media error and corrupted data, and reconstructing the corrupted data into a corresponding proper form.

16. The computer-readable media of claim 15, wherein the method further comprises:

predicting, using a processor, amounts of workload activity on the storage system during future time periods, wherein the scrubbing of the eligible set of PSDs is scheduled based on the predicted amounts of workload activity.

17. The computer-readable media of claim 15, wherein the method further comprises:

ranking, using a processor, the PSDs of the eligible in an order according to the relative eligibility of the PSDs, wherein the scrubbing of the eligible set of PSDs is based on the order.

\* \* \* \* \*